US006841763B1

(12) United States Patent
Pang

(10) Patent No.: US 6,841,763 B1
(45) Date of Patent: Jan. 11, 2005

(54) HEAT INDUCTION WORKSTATION

(75) Inventor: Hua-Chang Pang, Taichung Hsien (TW)

(73) Assignee: KSP Technologies Corp., Taichung Hsien (TW)

( * ) Notice: Subject to any disclaimer, the term of this patent is extended or adjusted under 35 U.S.C. 154(b) by 0 days.

(21) Appl. No.: 10/649,013

(22) Filed: Aug. 27, 2003

(51) Int. Cl.[7] ............................ B23K 13/01; H05B 6/16

(52) U.S. Cl. ....................... 219/604; 219/600; 219/647; 219/655

(58) Field of Search ................................ 219/600–604, 219/632, 635, 645, 647, 655, 656, 494; 99/DIG. 14, 451; 426/234, 244, 524; 62/229

(56) References Cited

U.S. PATENT DOCUMENTS 4,745,252 A * 5/1988 Roth et al. .................. 219/647
6,326,597 B1 * 12/2001 Lubomirsky et al. ....... 219/494
6,451,364 B1 * 9/2002 Ito ............................ 426/244
6,786,058 B2 * 9/2004 Sanna ......................... 62/229
2003/0111459 A1 * 6/2003 Nishimura .................. 219/656

* cited by examiner

*Primary Examiner*—Tu Hoang
(74) *Attorney, Agent, or Firm*—Alan D. Kamrath; Nikolai & Mersereau, P.A.

(57) ABSTRACT

A heat induction workstation has a base, a housing, a working station, an electrical power supplier and a cooling device. The housing has two baffles to divide the inner space of the housing into a central chamber and two side chambers. The working station is mounted in the central chamber and has at least one induction heating device. The electrical power supplier and the cooling device are respectively received in the side chambers. The electrical power supplier is electrically connected to the working station to provide electrical power to the working station. The cooling device is connected to the electrical power supplier to reduce the temperature of the electrical power supplier while the electrical power supplier is in operation.

6 Claims, 2 Drawing Sheets

HEAT INDUCTION WORKSTATION

BACKGROUND OF THE INVENTION

1. Field of the Invention

The present invention relates to a heat induction workstation, and more particularly to a packaged heat induction workstation to reduce the space for set up the workstation.

2. Description of Related Art

Induction heat is always used to heat part of a working piece for sealing, heat treatment and so on. A heat induction assembly in accordance with the prior art comprises an induction heating device, an electrical power supplier and a cooling device. The induction heating device is used to heat part of a work piece. For a heat treatment process, a cooling pool is mounted below the induction heating device for quenching the work piece. The electrical power supplier provides electrical power to the induction heating device. The cooling device is connected to the electrical power supplier to reduce the temperature of the electrical power supplier while the heat induction assembly is in operation.

However, the induction heating device, the electrical power supplier and the cooling device of the conventional heat induction assembly are separate parts to each other. It takes too much time for a user to assemble the induction heating device, the electrical power supplier and the cooling device to a conventional heat induction assembly before use. In addition, to test the assembled conventional heat induction assembly is necessary, and this also takes time. Furthermore, a large space is needed to set up the assembled conventional heat induction assembly.

To overcome the shortcomings, the present invention tends to provide a heat induction workstation to mitigate or obviate the aforementioned problems.

SUMMARY OF THE INVENTION

The main objective of the invention is to provide a heat induction workstation that is easy to use and can reduce the space required for setting up the heat induction workstation. The beat induction workstation has a base, a housing, a working station, an electrical power supplier and a cooling device. The housing has an opening and two baffles to divide the inner space of the housing into a central chamber communicated with the opening and two side chambers. The working station is mounted in the central chamber in the housing and has at least one induction heating device. The electrical power supplier and the cooling device are respectively received in the side chambers. The electrical power supplier is electrically connected to the at least one induction heating device to provide electrical power to the at least one induction heating device. The cooling device is connected to the electrical power supplier to reduce the temperature of the electrical power supplier while the electrical power supplier is in operation. With such an arrangement, a packaged heat induction workstation is provided, such that the space for setting up the heat induction workstation is reduced.

Other objects, advantages and novel features of the invention will become more apparent from the following detailed description when taken in conjunction with the accompanying drawings.

DETAILED DESCRIPTION OF PREFERRED EMBODIMENT

Figure 1:
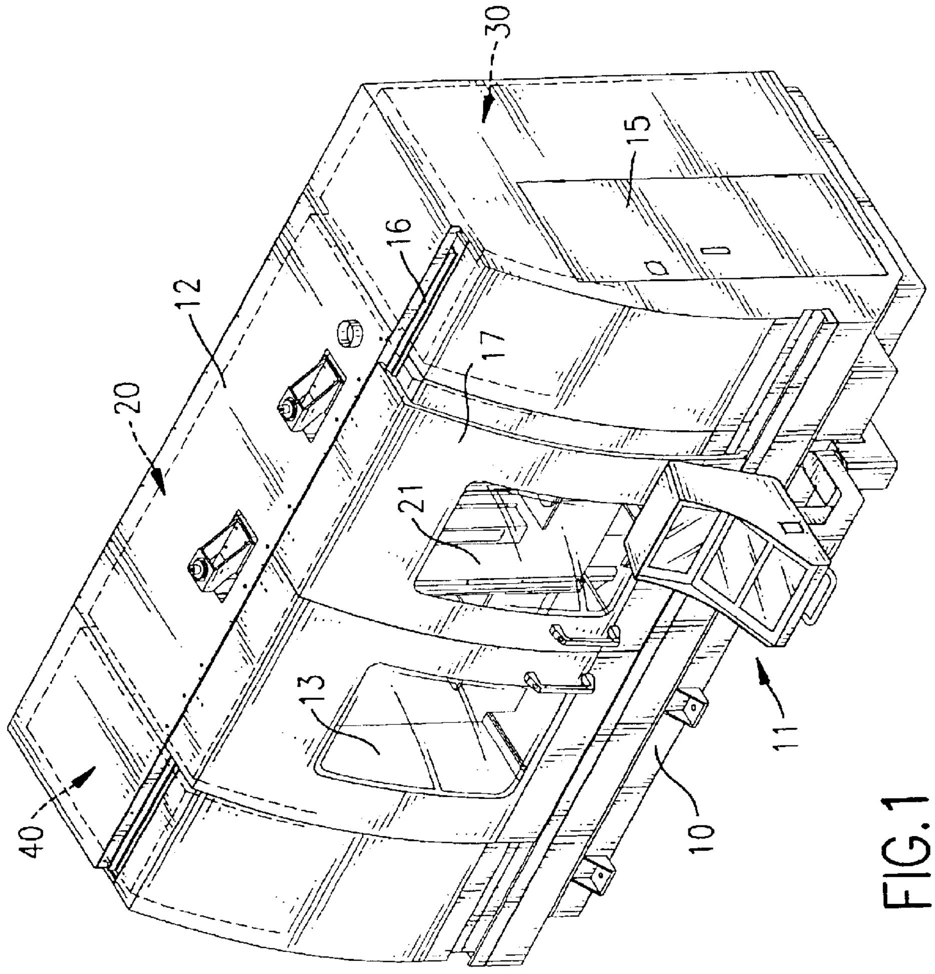
FIG. 1 is a perspective view of a heat induction workstation in accordance with the present invention.
Figure 2:
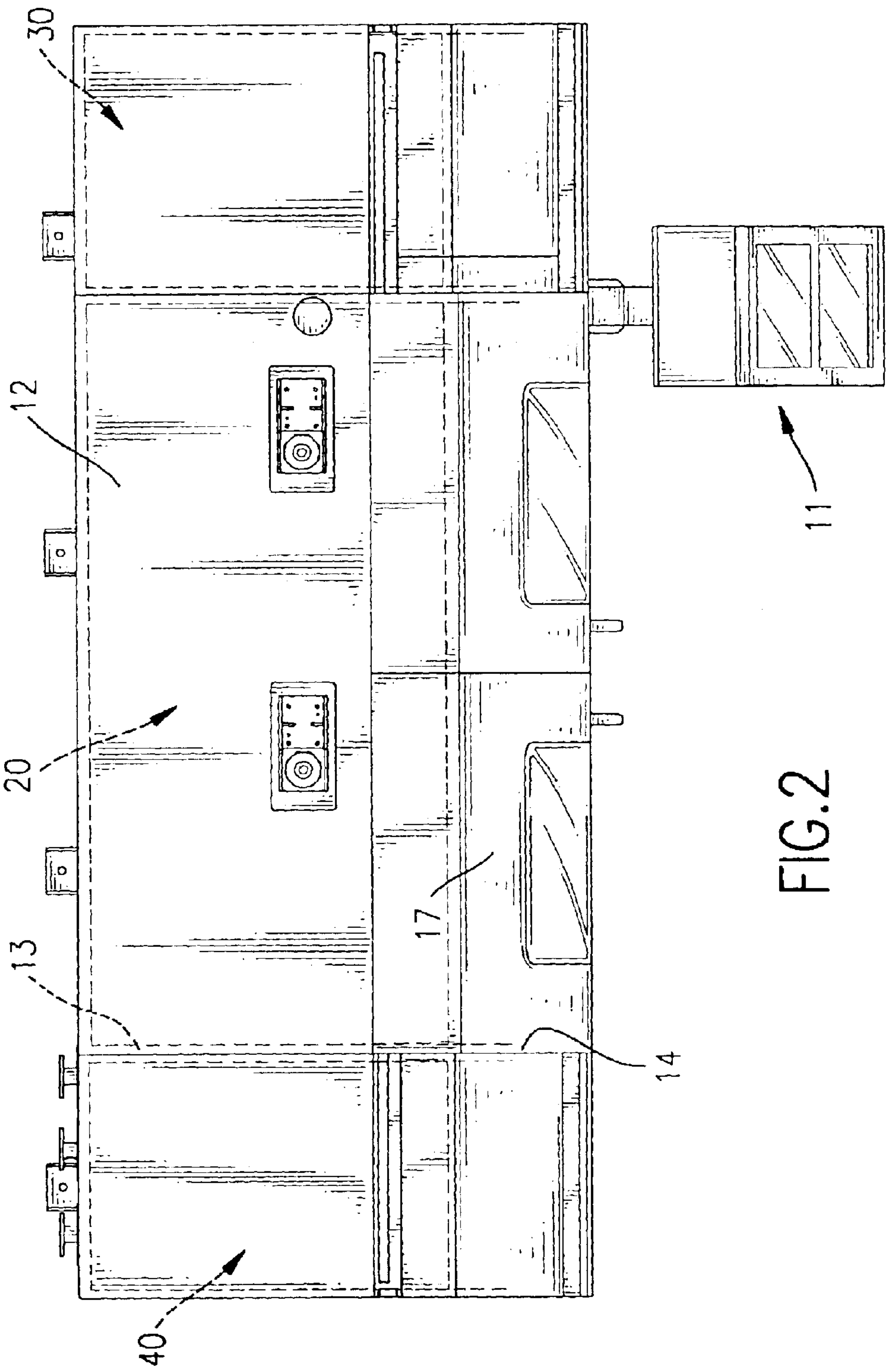
FIG. 2 is a top plan view of the heat induction workstation in FIG. 1.

With reference to FIGS. 1 and 2, a heat induction workstation in accordance with the present invention comprises a base (10), a housing (12), a working station (20), an electrical power supplier (30) and a cooling device (40). The housing (12) is mounted on the base (10) and has a top, a front, two sides and an inner space. An opening (14) is defined in the front of the housing (12). Two baffles (13) are formed in the housing (12) to divide the inner space into a central chamber communicated with the opening (14) and two side chambers. Two rails (16) are respectively mounted on the top and the front of the housing (12). Two front doors (17) are slidably mounted between the rails (16) on the housing (12) to close the opening (14) in the housing (12). When the front doors (17) are slid away from each other along the rails (16), the opening (14) will be opened.

The working station (20) is mounted in the central chamber in the housing (12). The working station (20) comprises two induction heating devices (21) mounted in the central chamber. Each induction heating device (21) substantially comprises a work piece-clamping device for clamping a work piece and a coil for generating induction heat to heat whole or part of the work piece. For a heat treatment process, a cooling pool (not shown) is mounted in the central chamber of the housing (12) and corresponds to each induction heating device (21). After the work piece is heated with one of the induction heating devices (21), the work piece can be immersed in the quench bath stored in the cooling pool for quenching.

The electrical power supplier (30) is mounted in one of the side chambers and is electrically connected to the induction heating devices (21) to provide electrical power to the induction heating devices (21). The cooling device (40) is mounted in the other side chamber and is connected to the electrical power supplier (30) to reduce the temperature of the electrical power supplier (30) while the electrical power supplier (30) is in operation. The structures of the electrical power supplier (30) and the cooling device (40) are conventional and are not further described.

Each respective side of the housing (12) has a side opening defined in the side. A side door (15) is pivotally attached to each respective side of the housing (12) to close the corresponding one of the side openings. Accordingly, the user can check or fix the electrical power supplier (30) and the cooling device (40) through the side doors (15).

In addition, a control panel (11) is attached to the housing (12) and is electrically connected to the induction heating devices (21), the electrical power supplier (30) and the cooling device (40) to control the operation of the heat induction workstation.

With such an arrangement, a packaged beat induction workstation is provided. For a user, to assemble and to test the heat induction workstation are not necessary. For a manufacturer, a packaged heat induction workstation is easily manufactured and assembled. The packaged heat induction workstation in accordance with the present invention is easy to use and to manufacture, such that the cost and time for using and manufacturing the heat induction workstation is low. In addition, the space for setting up the packaged heat induction workstation can be reduced in relation to prior art.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A heat induction workstation comprising:

a base;

a housing with a front, a top, a bottom, two sides and an inner space and mounted on the base and having an opening defined in the front, and two baffles formed in the housing to divide the inner space in the housing into a central chamber communicated with the opening, a first side chamber and a second side chamber;

a working station assembly mounted in the central chamber in the housing and comprising at least one induction heating device mounted in the central chamber;

an electrical power supplier mounted in the first side chamber and electrically connected to the at least one induction heating device to provide electrical power to the at least one induction heating device; and a cooling device mounted in the second side chamber and connected to the electrical power supplier to reduce temperature of the electrical power supplier while the electrical power supplier is in operation.

2. The heat induction workstation as claimed in claim 1 further comprising at least one front door slidably attached to the front of the housing to close the opening.

3. The heat induction workstation as claimed in claim 2 further comprising two rails respectively mounted on the top and the front of the housing for the at least one door being slidably mounted between the rails.

4. The heat induction workstation as claimed in claim 1, wherein the each respective side of the housing has a side opening defined in the side; and a side door is pivotally attached to each respective side of the housing to close the corresponding one of the side openings.

5. The heat induction workstation as claimed in claim 1 further comprising a control panel attached to the housing and electrically connected to the at least one induction heating device, the cooling device and the electrical power supplier.

6. The heat induction workstation as claimed in claim 1 further comprising a cooling pool mounted in the central chamber of the housing and corresponding to each at least one induction heating device.

* * * * *